United States Patent [19]

Dickey

[11] Patent Number: 4,727,548
[45] Date of Patent: Feb. 23, 1988

[54] ON-LINE, LIMITED MODE, BUILT-IN FAULT DETECTION/ISOLATION SYSTEM FOR STATE MACHINES AND COMBINATIONAL LOGIC

[75] Inventor: John A. Dickey, Palm Bay, Fla.
[73] Assignee: Harris Corporation, Melbourne, Fla.
[21] Appl. No.: 904,670
[22] Filed: Sep. 8, 1986
[51] Int. Cl.⁴ .................. G01R 31/28; G06F 11/00
[52] U.S. Cl. ................................. 371/49; 371/62
[58] Field of Search ............... 371/49, 15, 62, 60; 364/738

[56] References Cited

U.S. PATENT DOCUMENTS

| | | | |
|---|---|---|---|
| 3,555,255 | 1/1971 | Toy | 371/49 |
| 3,567,916 | 3/1971 | Fullton, Jr. | 371/49 |
| 3,732,407 | 5/1973 | Brewster et al. | 371/49 X |
| 3,805,040 | 4/1974 | Boden et al. | 371/49 X |
| 3,911,261 | 10/1975 | Taylor | 371/49 |
| 4,291,407 | 9/1981 | Armstrong | 371/49 |
| 4,524,449 | 6/1985 | Colling | 371/62 X |

*Primary Examiner*—Charles E. Atkinson
*Attorney, Agent, or Firm*—Antonelli, Terry & Wands

[57] ABSTRACT

A mechanism for the testing of digital signal processing circuitry (state machines and combinational logic) is built-in and continuously on-line with the system being tested. The operation of the signal processing architecture is monitored dynamically, namely across state transitions, employing a parity prediction operator which predicts the parity that should be produced by combining the contents of selected inputs and outputs of the architecture prior to and subsequent to a signal processing transition. If, due to a single bit failure, the predicted parity is not achieved, the output of an error detector will indicate a state other than that corresponding to the predicted parity and thereby report an error. To ensure accurate operation of the error reporting mechanism, the error signal is modulated by a clock signal the frequency of which is relatively low compared with the system clock that controls state transitions. The detection of interconnect wiring faults (e.g. among state machines) is accomplished by executing an exclusive-OR modulation of the digital signals with a prescribed clock signal the frequency of which is lower than the highest signal level transition rate expected on a communication link upstream of transmission over the link whose continuity is being tested. At the downstream end of the link, immediately adjacent entry into the state machine, the link is coupled to an activity detector. If the activity detector fails to detect change of state activity (i.e. the modulating clock) during a prescribed time window, a fault on the link is declared.

36 Claims, 3 Drawing Figures

FIG. 2.

| | INPUTS N1=2 | CURRENT STATE (N4=4) | COMBINATIONAL OUTPUTS (N2=2) | NEXT STATE (N4=4) | STATE OUTPUTS (N3=3) | PARITY (ODD) (1) |
|---|---|---|---|---|---|---|
| T | 10 | 0110 | 11 | T+1  1010 | 101 | 0 |
| U | 00 | 1010 | 00 | U+1  0000 | 001 | 0 |
| V | 01 | 0100 | 10 | V+1  0100 | 000 | 1 |

20

ON-LINE, LIMITED MODE, BUILT-IN FAULT DETECTION/ISOLATION SYSTEM FOR STATE MACHINES AND COMBINATIONAL LOGIC

FIELD OF THE INVENTION

The present invention relates in general to the testing of digital signal processing circuits and is particularly directed to an on-line scheme for testing state machines and combinational logic, including the detection of faults in interconnect wiring.

BACKGROUND OF THE INVENTION

The majority of built-in test mechanisms currently employed for testing digital circuitry (state machines and combinational logic) fall into one of two primary categories:
 1—limited detection capability off-line test systems; and
 2—single or multiple bit correcting fault tolerant systems. Fault-tolerant systems tend to be extremely complex and are unnecessary for most signal processing applications. On the other hand, limited detection off-line test systems typically require that the circuitry under test interrupt its normal signal processing function, so that it may execute a self-test sequence. In addition to the drawback of halting operation, self-testing generally has a poor or only moderate level of effectiveness, in attempting to substantiate the absence of stuck-at-(one or zero) nodes. Most current test procedures involve either a functional system test in which the system operation of prescribed functions are tested, or the system is tested by a scan-in/scan-out test which uses test vectors to check flip-flops and combinational logic.

Currently, the functional test approach is the most widely employed; however, in general, it also suffers from the lowest degree of test effectiveness for digital logic in detecting all possible 'stuck at?' nodes, etc. and requires the highest level of customization and considerable interface isolation and simulation. In addition to problems of controllability and accessibility, there are also ample opportunities for the test circuitry itself to fail, thereby either indicating a false operational failure of the circuit being tested or preventing the reporting of an actual operational failure. Moreover, functional circuit testing requires that the test circuitry be customized to match both the architecture and functions of the circuit under test and often entails as much or greater design effort than the original circuit.

The 'scan-in/scan-out' type of test procedure, which is a more recent and popular scheme and has achieved reasonably acceptable levels of circuit and pinout overhead (e.g. twenty to fifty percent gate overhead depending on application and as few as two additional input/output pins per chip), is based upon converting all state machines in a system into a sequence of shift registers and piping long test vectors through the sequence to check for faulty flip-flops, and then loading test vectors into the combinational logic in parallel and shifting the vectors out serially so as to effectively transfer the combinational logic into and out of each flip-flop.

While the scan-in/scan-out scheme is a more general approach to the problem and is usually incorporated into the integrated circuitry containing the state machine and combinational logic, rather than being built around these circuits as functional testers, it still has a number of significant limitations. First of all, the system under test must be interrupted to be tested. Secondly, a custom test vector which matches the user's circuit configuration must be generated. Thirdly, the level of testability that can be achieved by this technique is inherently limited.

Thus, there exists a gap in the technology; i.e. the lack of a satisfactory method of performing a high level of on-line testing without the extreme complexities (three or more times the complexity of the original circuit function) that accompany fault-tolerant systems.

SUMMARY OF THE INVENTION

In accordance with the present invention, there is provided a new and improved methodology for the testing of digital circuitry (state machines and combinational logic) that is both built-in and continuously on-line with the system being tested. Pursuant to the testing scheme of the present invention, the operation of a state machine and combinational logic architecture is monitored dynamically, namely across state transitions, employing a parity prediction operator which predicts the parity that should be produced by combining the contents of selected inputs and outputs of the architecture prior to and subsequent to a signal processing transition. If, due to a single bit failure, the predicted parity is not achieved, the output of an error detector will indicate a state other than that corresponding to the predicted parity and thereby report an error. To ensure accurate operation of the error reporting mechanism, the error signal is modulated by a clock signal synchronized with the system clock that controls state transitions and the frequency of which is relatively low compared with that of the system clock. The modulation output of the error reporting mechanism is compared in phase with the modulation clock. If there is a phase difference between the two, it is assumed that there is an error in the error reporting mechanism. Preferably this phase comparison operation is carried out through redundant (parallel-connected) circuits the output of which are coupled to a majority voting mechanism or multiple error indicators.

In order to execute a dynamic parity prediction function which combines conditions existing prior to and subsequent to a state transition, the parity prediction operator, which may be implemented as a programmable read only memory (PROM) or in combinational logic, contains a look-up table whose entries are binary bit values which, when combined with selected inputs and outputs of the state machine-combinational logic architecture for its current state and outputs for the next state (and assuming no single bit failure) produces a prescribed parity-representative output. The look-up table entry is accessed during the current state using the same information to which the state machine-combinational logic architecture responds in defining its next state. Prescribed contents of an output register of the state machine-combinational logic architecture are coupled to a feedback loop to be combined with the contents of separate input lines, thereby yielding a state control input code to which the state machine-combinational logic architecture responds in producing a set of combinational outputs and a set of state machine outputs. Upon the occurrence of a state transition (defined by a system clock edge), an exclusive-OR combination of the parity predictor look-up table entry, the inputs to the state machine-combinational logic architecture and its combinational outputs is latched into a one-bit delay flip-flop. This clock edge also loads the output register of the state machine-combinational logic architecture with its response to the next state defining information, referenced above. An exclusive-OR combination of the contents of the output register (next state-representative information) is exclusive-OR combined with a bit that is latched in the one-bit delay flip-flop, thereby producing an output (one or zero) which, for no single bit failure, corresponds to the predicted parity. If a single bit failure has occurred anywhere in the system, the predicted parity will be incorrect, corresponding to an error signal.

In order to handle the occurrence of a failure in the link over which the error signal is reported, the error indication signal is effectively modulated by a reference clock signal by exclusive-OR combining the modulation signal upstream of the error reporting function.

The detection of interconnect wiring faults (e.g. among state machines) is accomplished by executing an exclusive-OR modulation of the digital signals with a prescribed clock signal (square wave) the frequency of which is lower than the highest signal level transition rate expected on a communication link upstream of transmission over the link whose continuity is being tested. At the downstream end of the link, immediately adjacent entry into the state machine (which preferably incorporates a demodulation exclusive-OR circuit at its front end), the link is coupled to an activity detector. If the activity detector fails to detect change of state activity (i.e. the modulating clock) during a prescribed time window, a fault on the link is declared.

To detect a failure in the reporting mechanism of each activity detector, the modulation clock signal is exclusive-OR combined with the output of each activity detector in a daisy-chain fashion. The downstream end of the daisy-chain path is phased-compared with the modulation clock signal. Should there be phase difference (180° inversion) between the two signals, a reporting fault is declared. Isolation of the fault can be effected by comparing the activity input and the daisy-chain clock input of each activity detector for the presence of a phase inversion through the exclusive-OR circuit for each respective activity detector.

BRIEF DESCRIPTION OF THE DRAWINGS

FIG. 2 is a state table for explaining the operation of the system shown in FIG. 1.

DETAILED DESCRIPTION

Figure 1:
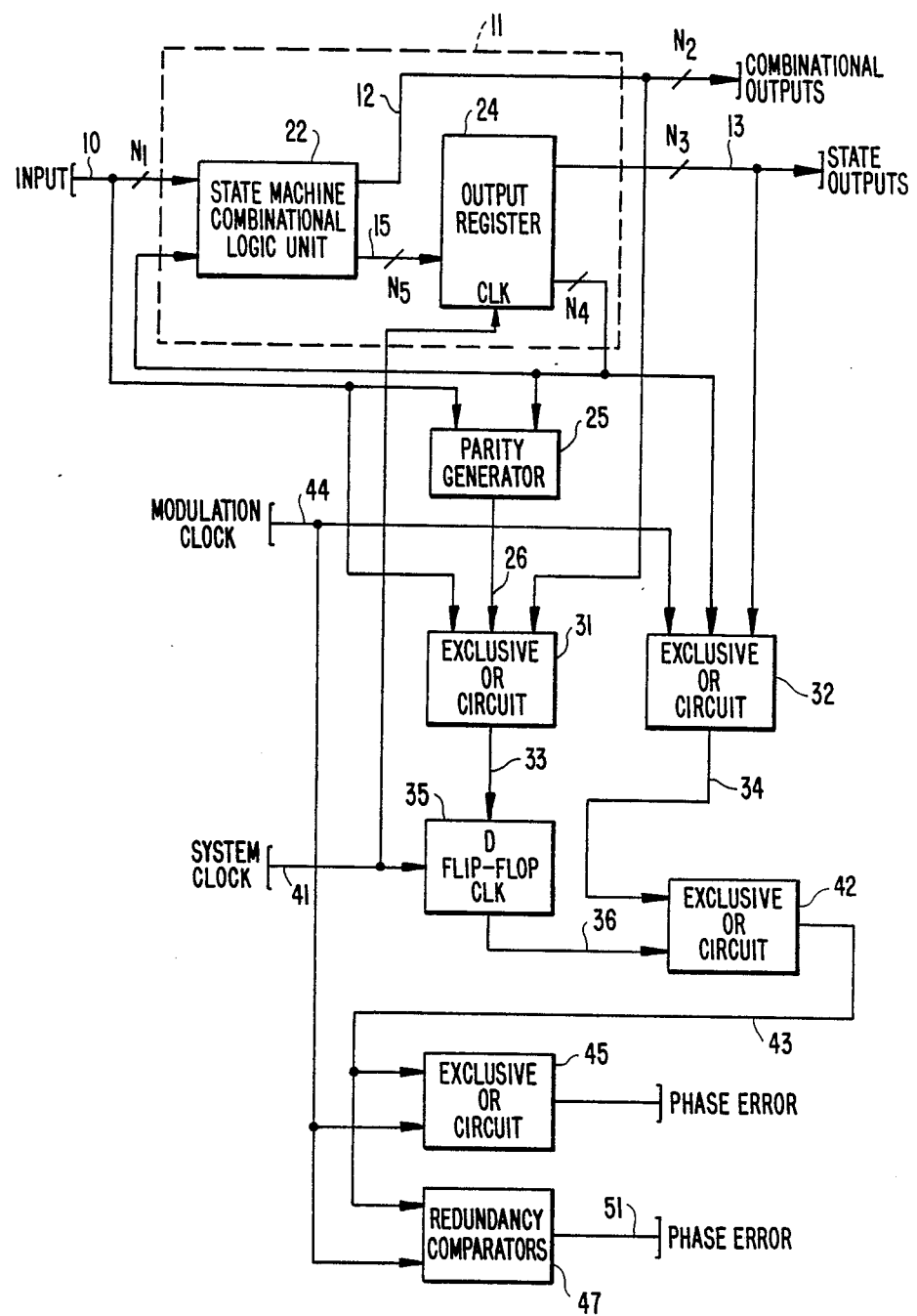
FIG. 1 is a schematic block diagram illustration of a fault detection/isolation system for state machine-combinational logic architectures in accordance with the present invention.

Before describing, in detail, the particular improved fault detection/isolation system in accordance with the present invention, it should be observed that the present invention resides primarily in a novel structural combination of conventional signal processing circuits and not in the particular detailed configurations thereof. Accordingly, the structure, control and arrangement of such conventional circuits have been illustrated in the drawings by readily understandable block representations and schematic logic diagrams, which show only those specific details that are pertinent to the present invention, so as not to obscure the disclosure with structural details which will be readily apparent to those skilled in the art having the benefit of the description herein. In addition, the illustration of a state machine and associated combinational logic has been simplified in order to emphasize those portions that are most pertinent to the present invention. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

In addition, throughout the present description, it is to be understood that the phrase "state machine and associated combinational logic" is used in a general sense and is not limited to any specific circuit function or implementation. As such, it includes, but is not limited to programmable logic circuit configurations such as AND/OR gate arrangements, array logic, logic devices, logic arrays, etc. Also, the term programmable is employed in its general sense and includes, but is not limited to mask programmable, fuse programmable, etc. circuits, devices, arrays, etc.

Referring now to FIG. 1 of the drawings, which shows a schematic block diagram illustration of a fault detection/isolation system in accordance with the present invention, a logic circuit architecture to be tested (state machine-combinational logic) 11 is coupled to receive digital input signals over an input link 10 and to produce combinational logic output levels over an output link 12 and one or more state output levels over an output link 13. The bit capacity of the respective digital coupling links of the architecture is not limited to any specific number and is not necessarily the same for each link. Accordingly, the bit capacity of each link has been shown in FIG. 1 by a general descriptor $N_i$ denoting a respective generalized bit capacity of the link of interest. Thus, in FIG. 1, input link 10 has a bit capacity $N_1$ the combinational logic output link 12 has a bit capacity of $N_2$, while state output link 13 has bit capacity $N_3$.

Within the state machine-combinational logic architecture 11, there is a state machine-combinational logic unit 22 and an output register 24. The state machine outputs are coupled over link 15 (of bit capacity $N_5$) to the respective flip-flop stages of output register 24. As noted above, the combinational logic outputs of the state machine-combinational logic unit 22 are coupled over link 12.

Typically, the logic circuit architecture to be tested employs a feedback path for controlling its signal processing function. The feedback path is derived from one or more flip-flops within the output register 24 and is denoted in FIG. 1 as feedback link 14 of a bit capacity $N_4$ which forms, together with the input line 10, a multibit control code to which the state machine-combinational logic unit 22 responds in producing resulting combinational logic outputs on link 12 and state outputs on link 15. Link 14 may comprise one or more of the state outputs of link 13; however, for purposes of the present description it is shown as a separate link.

As pointed out previously, the present invention employs a mechanism for testing the operation and functionality of logic circuit architecture 11 dynamically, namely across a state transition boundary (between states). Through this mechanism, not only is the present invention capable of checking the state of a machine at any particular time, but it is capable of determining whether the state in which the machine currently resides is the correct state in which it should reside in the course of its transitioning from a previous state. Conventional parity check mechanisms selectively combine the contents of prescribed signal coupling lines to execute a parity check and to produce an error where the parity check mechanism indicates an erroneous state. However, such mechanisms are effectively static, in that they look at only one state at a time and cannot indicate whether the state machine, even though its parity may be correct for a particular state, has progressed to that state in accordance with the correct signal processing sequence.

Pursuant to the present invention, a parity prediction operator examines prescribed input and output lines of the logic circuit architecture and predicts what the combined parity of the current state and the next state of selected signal lines of the architecture should be. If, as a result of a single bit error, the predicted combined parity and the actually obtained parity do not coincide, an error signal is generated.

In order to form the parity prediction operator, feedback link 14 and input link 10 of architecture 11 are coupled to form the inputs of a parity generator 25, the output of which is coupled as one input of a signal combining code generator 31 shown in FIG. 1 as an exclusive-OR circuit. Code generator (exclusive-OR circuit) 31 combines plural inputs and produces a single or multiple bit output code based on the combination of the inputs, as a state predictive operator. More particularly, for the case of code generator 31 implemented as an exclusive-OR circuit, parity generator 25 may comprise a look-up table (programmable read only memory or combination logic) which produces an output over link 26 the state of which, when combined with the information on links 10 and 12, will produce on link 33, at the output of exclusive-OR circuit 31, a state predictive of the bit produced by an exclusive-OR circuit 32 on link 34 which is coupled to state links 13 and 14 from output register 24.

Namely, parity generator 25 is configured with the knowledge of the operation of the state machine and combinational logic 22, which receives the same set of inputs, so that, for successive states of the architecture being monitored, parity generator 25 knows, in advance, the next state to which the architecture should advance as defined by the control code on links 10 and 14. As such, parity generator 25 supplies an output code (e.g. bit—a one or a zero) over link 26 to be employed as a parity prediction control bit. This code (bit), together with the digital signal levels on input link 10 and the digital contents of link 12 are combined in code generator (exclusive-OR circuit) 31 and applied over link 33 as an input to a storage unit (e.g. for a single bit—a flip-flop) 35. Flip-flop 35 is clocked via a clock signal on link 41, which is also coupled to load output register 24 with the contents of link 15 from the logic circuit architecture 11. One of the edges of the clock signal on link 41 (e.g. the positive going edge) defines the transition between successive states. That clock edge is used to load whatever state outputs are supplied over link 15 into output register 24 and to load whatever information is supplied over link 33 from exclusive-OR circuit 31 into flip-flop 35. In effect, flip-flop 35 constitutes a one clock cycle delay component, so that information corresponding to the current state may be captured and compared with information produced for the next state.

The output of flip-flop 35 is coupled over link 36 as one input to exclusive-OR circuit 42. The output link 34 from exclusive-OR circuit 32 is coupled as the other input to exclusive-OR circuit 42. Exclusive-OR circuit 42 provides a combined parity bit over output link 43 which represents whether or not the state machine-combinational logic architecture 11 has properly sequenced from a previous state to its current state. Namely, the output of exclusive-OR circuit 42 which represents the combined parity of input information supplied over link 10, the current state of the logic architecture 11 (as represented by the contents of link 14) combinational outputs on link 12, next state information subsequent to the clock transition (also represented by the contents of link 14) state outputs on link 13 and the parity information supplied by parity generator 25, which are effectively combined and compared with one another in exclusive-OR circuits 31 and 32, the outputs of which are coupled to exclusive-OR circuit 42. In the event of a one bit error, the output of exclusive-OR circuit on link 43 will change, indicating that an error has occurred in the course of a machine transition from one state to the next.

To illustrate this operation, attention is directed to FIG. 2 which shows a state table for respective states of input link 10, the current state/next state link 14, combinational output link 12, state output link 13 and the output of parity generator 25. Each of the headings T, U and V corresponds to the current state of the system at three respectively different points in time (not immediately succeeding one another). The immediately succeeding states (next states) for respective current states T, U and V are denoted by states T+1, U+1 and V+1. Line 20 in FIG. 2 denotes the positive going clock edge of the clock signal supplied over link 41 which defines the transition between the current state (i) and the next state (i+1). During the current state i, prior to transition 20, the contents of input link 10 will have changed from the previous state i−1 to their current state values. The contents of output register 24, however, will not change until the positive going clock transition 20 on link 41. The outputs of state machine-combinational unit 22, which are defined by the contents of selected ones of the flip-flops of output register 24 and the contents of input link 10, are supplied over links 12 and 15 at this time. The contents of link 15 are not yet latched into output register 24 because the clock transition 20 has not yet occurred. By looking at this information, however, and knowing that this information is used to define the next state (which is already available on link 15 but not yet latched into register 24) the look-up table within parity generator 25 knows what the next state will be and what output bit it should produce to establish a prescribed parity in accordance with the successive states i and i+1 in the state table of FIG. 2.

After the transition 20 of the clock signal supplied over link 41, the contents of output register 24, which now represent next state information, reflect what parity generator 25 knew would take place. Accordingly, and assuming no more than a single bit error in the operation of the machine, absent such a single bit error, the contents of link 36 and link 34, when combined in exclusive-OR circuit 42, should produce the parity predicted by parity generator 25. Using conventionally accepted parity identifiers, exclusive-OR gate 42 produces a one when the predicted parity is to be an odd parity and produces a zero when the predicted parity is even parity. Thus, assuming that all components of the system are operating correctly, the phase of the output on link 43 indicates whether a single bit error has occurred.

If, however, there is an error in the reporting mechanism (the output of exclusive-OR circuit 42 becomes stuck in either a zero or one state) there is no way of knowing the occurrence of this malfunction simply by looking at the output of exclusive-OR circuit 42. To overcome this reporting error problem, an additional signal line 44 is coupled as one input to exclusive-OR circuit 32 and as one input to exclusive-OR circuit 45, a second input of which is coupled to link 43 at the output of exclusive-OR circuit 42. Link 44 receives a clock signal (square wave) the rate of change of binary state of which is considerably lower than the rate of signal transition otherwise within the system. This clock signal effectively modulates the output of exclusive-OR circuit 42. If there is no error in the reporting mechanism, namely the error reporting circuit 42 is functioning correctly, the modulation on link 43 will be in phase with the clock signal supplied on link 44 and the output of phase comparator 45 (which may be an exclusive-OR circuit) will be a zero. On the other hand, if there is a fault in the reporting mechanism, the signals on link 43 and 44 will be out of phase, so that the output of phase comparator 45 will be the opposite state (a one). (To provide for additional reporting integrity, phase comparator 45 may be implemented using multiple redundant parallel units (shown in FIG. 1 as a set of redundancy comparators 47 having output links 51.) A suitable voting scheme for monitoring the redundancy-configured comparators may be employed for combining the outputs.)

An important aspect of coupling the error detection modulation clock on link 44 to the parity combining circuit (exclusive-OR circuits 31, 32 and 42) is the fact that link 44 must be coupled upstream of the output reporting exclusive-OR circuit 42. If all of the parity information were combined prior to coupling modulation clock 41 to the output comparator exclusive-OR circuit 42, then the output of the last exclusive-OR circuit in the parity generator would always be a fixed value (a one or a zero depending upon whether odd or even parity were selected). This itself would result in a single point failure that could not be detected and would inhibit the transmission of operational fault data. It is necessary, therefore, that the modulating signal be incorporated into the parity generator exclusive-OR circuitry upstream of the output comparator 42.

Figure 3:
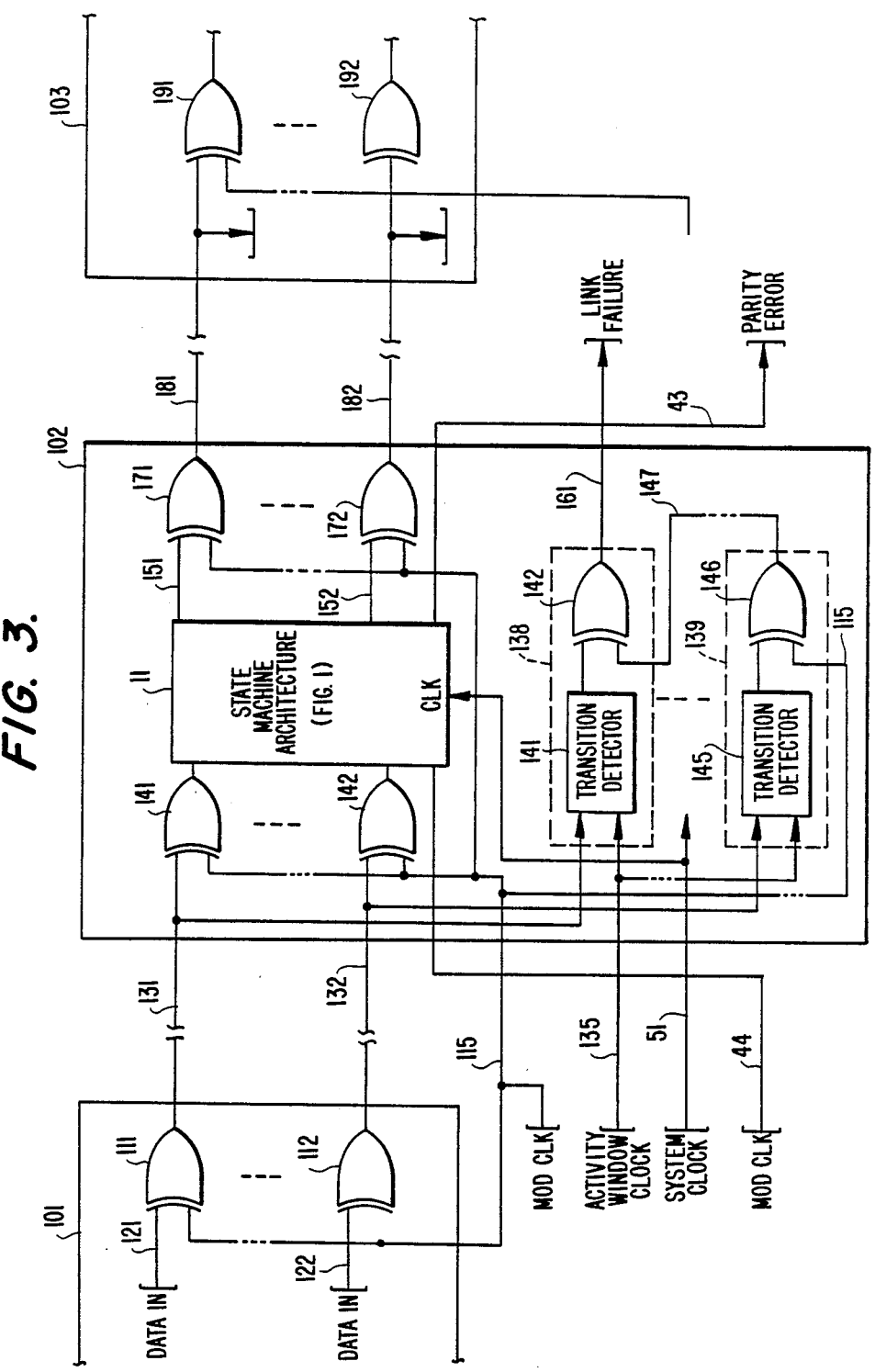
FIG. 3 is a diagrammatic illustration of a system configuration for testing the interconnectivity of digital signal transmission links.

Referring now to FIG. 3, there is shown a block diagram of the interconnection of system components of a digital signal processing network and an interconnect wiring fault detection system in accordance with the present invention, associated with the digital signal communication links through which the respective network components are interconnectable. A data source unit 101 is shown as comprising a plurality of data input links 121 . . . 122 to be respectively coupled over signal communication links 131 . . . 132 to a network component 102, which may include a state machine 22 corresponding to that illustrated in FIG. 1, described above. Outputs of the state machine architecture 22 are coupled over links 151 . . . 152 to be applied to communication links 181 . . . 182 for transmission to a downstream network component 103.

Pursuant to the present invention, incorporated into the signal processing network is an interconnectivity fidelity monitoring and error reporting mechanism for effectively continuously testing the interconnectivity of the communication links between successive components of the network.

For this purpose, the state of each communication link is effectively modulated with a prescribed clock signal and the continuity of the interconnection link is tested by observing whether or not the modulations are present on the link. A lack of activity on the link indicates a transmission failure over the link. At the downstream end of the link, the modulation clock signal is removed so that the original digital data may be coupled to the intended network component.

Modulation of digital information on the respective communication links is effectively accomplished by the insertion of a respective exclusive-OR circuit into each link and applying the modulating clock to a second input of each exclusive-OR circuit. This is illustrated in FIG. 3 by the insertion of exclusive-OR gates 111 . . . 112 at the upstream end of communication links 131 . . . 132 where the data of interest is derived from input data links 121 . . . 122, respectively. A modulation clock signal is coupled over link 115 and supplied to a second input of each of exclusive-OR gates 111 . . . 112. The frequency of the modulation clock signal on link 115 is substantially less than the rate of change of the states of input signals 121 . . . 122, so that for some prescribed measurable time window a modulated binary data signal (square wave signal at the frequency of the modulating clock) will appear on each of communication link 131 . . . 132.

At the downstream end of each link, a respective activity detector 138 . . . 139 is incorporated into network component 102. Each activity detector may comprise a conventional energy monitoring device, such as signal detector and integrator, the output of which remains in a prescribe binary state as long as there is measurable activity on a respective communication link (131 . . . 132). A lack of activity over a prescribed time window indicates a communication failure over the link causing an error output to be generated.

Considering an individual one of activity detectors 138 and 139, activity detector 138 has a data input coupled to communication link 131 and an activity window clock input coupled over link 135 to receive a prescribed gating clock which is used to gate the state of data input line 131 to a transition detector 141 within the activity detector 138. A sampling or gating period is selected to be longer than the longest period of time during which signal link 131 could possibly track the modulation signal on link 115, thereby avoiding an erroneous fault report. During the activity window clock interval, all input signals are expected to have been in both a logical state zero and a logical state one. The activity detector 138 monitors this information and, at the end of the activity window interval, reports that the communication transmission is valid if its input has achieved both binary states during this period of time, but reports a fault if the input state has not changed during the activity window.

To avoid the problem of latent failures in the reporting mechanism, the error reporting output of each respective detector is coupled through a respective exclusive-OR circuit in a daisy chain fashion. This is shown in FIG. 3 by the connection of modulation clock link 115 to an error detect input (one input of exclusive-OR circuit 146 within activity detector 139) and the output of transition detector 145 to a second input of exclusive-OR circuit 146. The output of exclusive-OR circuit 146

(the error detection output link 147) is coupled to one input of an exclusive-OR circuit of the next activity detector, and so on, with the final output 161 being derived from the last exclusive-OR circuit 142 within activity detector 138. If the transition detector within any activity detector remains in the same binary state for an entire activity window period, the output link 161 will be out of phase with the clock signal on link 115.

Downstream of each interconnection link 131 ... 132, the modulations are removed by mirroring the exclusive-OR circuits employed at the upstream end of the link between the inputs to the state machine 22 and communications link 131 ... 132. Second inputs of each of the exclusive-OR circuits 141 ... 142, to which links 131 ... 132 are coupled, are driven by the modulation clock on link 115. This has the effect of removing the modulation from the modulated signals supplied over links 131 ... 132, so that the original states of the data signals on links 121 ... 122 are coupled to the state machine 22.

The outputs of the state machine 22 within network component 102 are coupled over links 151 ... 152 to exclusive-OR gates 171 ... 172 in the same manner that data inputs 121 ... 122 are coupled to respective first inputs of exclusive-OR gates 111 ... 112 for component 101. In other words, the same modulation scheme employed for links 131 ... 132 is employed for downstream links 181 ... 182, etc. Each respective network component includes its own set of activity detectors associated with incoming communication links for monitoring the state of those links and thereby the continuity of the communication interface between network components.

In the configuration shown in FIG. 3, it is to be observed that the error reporting mechanism, which encompasses the use of exclusive-OR circuits at the input and output ports of the state machine, permits a system controller to distinguish whether a fault is internal to a state machine or exits in the communication medium between network components (state machines). As seen from FIG. 3, this separation of logic elements requires an increase in interface and control lines into and out of the state machine. The number of interface and control lines can be reduced by combining clock lines 115 and 44 (using a common clock for lines 44 and 115) and combining line 161 with output link 43 of exclusive-OR circuit 42 in a daisy chain fashion. To avoid missing single point failures at the outputs of demodulating exclusive-OR circuits 141 ... 142, these circuits may be incorporated as part of the combinational logic of state machine-combinational logic unit 22.

While I have shown and described an embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed:

1. For use with a digital signal processing circuit having an input link to which at least one input signal is applied and an output link from which at least one output signal, characteristics of which depend upon the operation of said signal processing circuit with respect to signals applied to said input link, is derived, said at least one output signal being selectively fed back over a feedback link to be combined with said at least one input signal and applied to said input link, an arrangement for testing the operation of said signal processing circuit comprising:

first means, coupled to said input and output links, for generating a control signal which, when selectively combined with said at least one input signal and said at least one output signal derived from said signal processing circuit for an $i^{th}$ signal processing state and for an $(i+1)^{th}$ signal processing state thereof, produces a first prescribed output signal in the absence of an error in the operation of said signal processing circuit; and second means, coupled to said input and output links and to said first means, for selectively combining said control signal, said at least one input signal and said at least one output signal derived from said signal processing circuit for said $i^{th}$ signal processing state and said at least one output signal derived from said signal processing circuit for said $(i+1)^{th}$ signal processing state and producing said first prescribed output signal in the absence of an error in the operation of said signal processing circuit and producing a second prescribed output signal in response to the occurrence of an error in the operation of said signal processing circuit.

2. An arrangement according to claim 1, wherein said first prescribed output signal is representative of the parity obtained by selectively combining said at least one input signal, said control signal and said at least one output signal derived from said signal processing circuit for said $i^{th}$ signal processing state and said at least one output signal derived from said signal processing circuit for said $(i+1)^{th}$ signal processing state.

3. An arrangement according to claim 1, wherein said second means includes means, coupled to said signal processing circuit, said first means and said input link, for combining signals derived therefrom for said $i^{th}$ signal processing state and producing a first state representative output signal.

4. An arrangement according to claim 3, wherein said second means includes means for temporarily storing said first state representative output signal during said $(i+1)^{th}$ signal processing state.

5. An arrangement according to claim 4, wherein said second means includes means, coupled to said output link and to the output of said temporarily storing means, for selectively combining said first state representative output signal with said at least one output signal derived from said signal processing circuit for said $(i+1)^{th}$ signal processing state and producing in response thereto one of said first and second prescribed output signals.

6. An arrangement according to claim 5, wherein said first prescribed output signal is representative of the parity obtained by selectively combining said at least one input signal, said control signal and said at least one output signal derived from said signal processing circuit for said $i^{th}$ signal processing state and said at least one output signal derived from said signal processing circuit for said $(i+1)^{th}$ signal processing state.

7. An arrangement according to claim 6, further including third means, coupled to said second means, for applying a prescribed modulation signal thereto and thereby effectively modulating said one of said first and second prescribed output signals.

8. An arrangement according to claim 7, further including fourth means, coupled to said second means and said third means, for comparing said modulation signal with said one of said first and second prescribed output signals produced by said second means and providing an output representative of a prescribed relationship between said modulation signal and said one of said first and second prescribed output signals.

9. An arrangement according to claim 2, wherein said digital signal processing circuit comprises a state machine-combinational logic unit for producing combinational logic outputs and logic state outputs in response to said at least one input signal and said selectively fed back at least one output signal, and storage means for temporarily storing said logic state outputs and providing therefrom said at least one output signal for a respective signal processing state.

10. An arrangement according to claim 9, wherein said second means includes means, coupled to said signal processing circuit, said first means and said input link, for combining signals derived therefrom for said $i^{th}$ signal processing state and producing a first state representative output signal.

11. An arrangement according to claim 10, wherein said second means includes means for temporarily storing said first state representative output signal during said $(i+1)^{th}$ signal processing state.

12. An arrangement according to claim 11, wherein said second means includes means, coupled to said output link and to the output of said temporarily storing means, for selectively combining said first state representative output signal with said at least one output signal derived from said signal processing circuit for said $(i+1)^{th}$ signal processing state and producing in response thereto one of said first and second prescribed output signals.

13. An arrangement according to claim 9, wherein said second means comprises means, coupled to said input link, said first means and said combinational logic outputs, for combining signals derived therefrom for said $i^{th}$ processing state and producing a first state representative output signal.

14. An arrangement according to claim 13, wherein said second means includes means for temporarily storing said first state representative output signal during said $(i+1)^{th}$ signal processing state.

15. An arrangement according to claim 14, wherein said second means includes means, coupled to said feedback link and contents of said storage means, for selectively combining signals derived therefrom for said $(i+1)^{th}$ processing state and producing a second state representative output signal and means for combining said first and second state representative output signals and producing in response thereto one of said first and second prescribed output signals.

16. For use in a digital signal processing system wherein digital signals are coupled between respective portions of said system by way of signalling communication links, a method of monitoring the transmission continuity of said communication links comprising the steps of:
(a) for a respective communication link, at an upstream portion thereof, modulating digital signals coupled thereto at a prescribed frequency lower than the rate of change of the state of said digital signals; and
(b) for said respective communication link, at a downstream portion thereof, monitoring said link for the presence of modulating activity for a prescribed measurement interval and, upon failing to detect the presence of modulation activity thereat, generating an output signal representative of the loss of transmission continuity of said link.

17. A method according to claim 16, wherein step (a) comprises coupling a first input of an exclusive-OR circuit to receive said digital signals to be transmitted over said communication link, a second input of said exclusive-OR circuit to receive a modulating clock signal having said prescribed frequency, and an output of said exclusive-OR circuit to said upstream portion of said communication link.

18. A method according to claim 16, further comprising the step of
(c) at said downstream portion of said respective communication link, coupling said link to a first input of an exclusive-OR circuit, a second input of which is coupled to receive said modulating clock signal, so that, at the output of the downstream exclusive-OR circuit the original digital signals coupled to the upstream portions of said link are effectively demodulated.

19. A method according to claim 18, wherein at least one prescribed one of said respective portions of said system comprises a state machine to inputs of which the outputs of downstream exclusive-OR circuits are respectively coupled.

20. For use in a digital signal processing system wherein digital signals are coupled between respective portions of said system by way of signalling communication links, an arrangement for monitoring the transmission continuity of said communication links comprising:
first means, disposed at an upstream portion of a respective communication link, for modulating digital signals coupled thereto at a prescribed frequency lower than the rate of change of the state of said digital signals; and
second means, disposed at a downstream portion of said respective communication link, for monitoring said link for the presence of modulating activity for a prescribed measurement interval and, upon failing to detect the presence of modulation activity thereat, generating an output signal representative of the loss of transmission continuity of said link.

21. An arrangement according to claim 20, wherein wherein said first means comprises a first exclusive-OR circuit a first input of which is coupled to receive said digital signals to be transmitted over said communication link, a second input of which is coupled to receive a modulating clock signal having said prescribed frequency, and an output of which is coupled to said upstream portion of said communication link.

22. An arrangement according to claim 21, further comprising, at said downstream portion of said respective communication link, a second exclusive-OR circuit a first input of which is coupled to receive digital signals that have been transmitted over said communication link, and a second input of which is coupled to receive said modulating clock signal, so that, at the output of said second exclusive-OR circuit, the original digital signals coupled to the upstream portion of said link are effectively demodulated.

23. An arrangement according to claim 20, wherein said second means comprises a plurality N of detector means, each of which is coupled to a respective communication link and is coupled to receive said modulating signal, for monitoring the respective link to which it is coupled for the presence of modulating activity for a prescribed measurement interval and, upon failing to detect the presence of modulation activity thereat during said prescribed measurement interval, generating a respective output signal representative of the loss of transmission continuity of said link.

24. An arrangement according to claim 23, wherein said second means further includes a plurality N of signal combining means, each respective one of which is coupled to receive the output of a respective detector means, the first of said signal combining means having an input coupled to receive said modulating signal and an output coupled to an input of a second of said signal combining means, and an $i^{th}$ one of said signal combining means has a first input coupled to the output of the $i^{th}$ detector means, a second input coupled to the output of the $(i-1)^{th}$ signal combining means, and an output coupled to an input of the $(i+1)^{th}$ signal combining means, so that the output of the $N^{th}$ one of said signal combining means provides an output representative of the error monitoring capability of said detector means, where $1<i<N$.

25. An arrangement according to claim 20, wherein at least one respective portion of said system comprises a digital signal processing circuit having input links to which downstream portions of first communication links are coupled and output links, coupled to upstream portions of second communication links, said output links supplying output signals characteristics of which depend upon the operation of said signal processing circuit with respect to signals applied to said input links said output signals being selectively fed back over a feedback link to be combined with input signals received at said input links.

26. An arrangement according to claim 25, further including an arrangement for testing the operation of said signal processing circuit comprising third means, coupled to said input and output links, for generating a control signal which, when selectively combined with said input signals and output signals derived from said signal processing circuit for an $i^{th}$ signal processing state and for an $(i+1)^{th}$ signal processing state thereof, produces a first prescribed output signal in the absence of an error in the operation of said signal processing circuit; and fourth means, coupled to said input and output links and to said third means, for selectively combining said control signal, said input signals and said output signals derived from said signal processing circuit for said $i^{th}$ signal processing state and output signal derived from said signal processing circuit for said $(i+1)^{th}$ signal processing state and producing said first prescribed output signal in the absence of an error in the operation of said signal processing circuit and producing a second prescribed output signal in response to the occurrence of an error in the operation of said signal processing circuit.

27. An arrangement according to claim 26, wherein said first prescribed output signal is representative of the parity obtained by selectively combining said input signals, said control signal and said output signals derived from said signal processing circuit for said $i^{th}$ signal processing state and said output signals derived from said signal processing circuit for said $(i+1)^{th}$ signal processing state.

28. An arrangement according to claim 27, wherein said fourth means includes means, coupled to said signal processing circuit, said third means and said input link, for combining signals derived therefrom for said $i^{th}$ signal processing state and producing a first state representative output signal.

29. An arrangement according to claim 28, wherein said fourth means includes means for temporarily storing said first state representative output signal during said $(i+1)^{th}$ signal processing state.

30. An arrangement according to claim 29, wherein said fourth means includes means, coupled to said output link and to the output of said temporarily storing means, for selectively combining said first state representative output signal with output signals derived from said signal processing circuit for said $(i+1)^{th}$ signal processing state and producing in response thereto one of said first and second prescribed output signals.

31. An arrangement according to claim 30, further including fifth means, coupled to said fourth means, for applying a prescribed modulation signal thereto and thereby effectively modulating said one of said first and second prescribed output signals.

32. An arrangement according to claim 31, further including sixth means, coupled to said fourth means and said fifth means, for comparing said modulation signal with said one of said first and second prescribed output signals produced by said fourth means and providing an output representative of a prescribed relationship between said modulation signal and said one of said first and second prescribed output signals.

33. For use with a digital signal processing circuit having an input link to which at least one input signal is applied and an output link from which at least one output signal, characteristics of which depend upon the operation of said signal processing circuit with respect to signals applied to said input link, is derived, said at least one output signal being selectively applied to a feedback link to be combined with said at least one input signal and applied to said input link, an arrangement for testing the operation of said signal processing circuit comprising:

first means for generating a control signal which, when selectively combined with said at least one input signal and said at least one output signal derived from said signal processing circuit for a first signal processing state and for an subsequent signal processing state thereof, produces a first prescribed output signal in the absence of an error in the operation of said signal processing circuit; and second means, coupled to said input and output links and to said first means, for selectively combining said control signal, said at least one input signal and said at least one output signal derived from said signal processing circuit for said first signal processing state and said at least one output signal derived from said signal processing circuit for said subsequent signal processing state and producing said first prescribed output signal in the absence of an error in the operation of said signal processing circuit and producing an second prescribed output signal in response to the occurrence of an error in the operation of said signal processing circuit.

34. An arrangement according to claim 33, wherein said first signal processing state corresponds to an $i^{th}$ signal processing state and said subsequent signal processing state corresponds to an $(i+1)^{th}$ signalling processing state.

35. An arrangement according to claim 33, wherein said second means includes means, coupled to said signal processing circuit, said first means and said input link, for combining signals derived therefrom for said first signal processing state and producing a first state representative output signal.

36. An arrangement according to claim 35, wherein said second means includes means for temporarily storing said first state representative output signal during said subsequent signal processing state.

* * * * *